United States Patent [19]

Lambert et al.

[11] Patent Number: 5,173,611
[45] Date of Patent: Dec. 22, 1992

[54] PHOSPHOR COMPOSITION AND X-RAY INTENSIFYING SCREEN EXHIBITING PEAK EMISSION IN THE ULTRAVIOLET

[75] Inventors: Patrick M. Lambert, Rochester; Philip S. Bryan, Webster; Gregory S. Jarrold, Henrietta; Christine M. Towers, Rochester, all of N.Y.

[73] Assignee: Eastman Kodak Company, Rochester, N.Y.

[21] Appl. No.: 822,387

[22] Filed: Jan. 17, 1992

[51] Int. Cl.$^5$ .............................................. C09K 11/67
[52] U.S. Cl. .......................... 250/483.1; 252/301.4 F; 428/690
[58] Field of Search .............. 252/301.4 F; 250/483.1; 428/690

[56] References Cited

U.S. PATENT DOCUMENTS

| | | | |
|---|---|---|---|
| 2,542,336 | 2/1951 | Kroger et al. | 252/301.4 |
| 3,941,715 | 3/1976 | Shidlovsky | 252/301.4 F |
| 4,980,559 | 12/1990 | Bryan et al. | 252/301.4 F |
| 4,988,880 | 1/1991 | Bryan et al. | 250/483.1 |
| 5,112,700 | 5/1992 | Lambert et al. | 423/690 |

FOREIGN PATENT DOCUMENTS 53-58491  5/1978  Japan ............................ 252/301.4 F

OTHER PUBLICATIONS

Labbe "Chem. Abstracts" vol. 64, 1966, 12173f.
Research Disclosure, vol. 184, Aug. 1979, Item 18431.
James The Theory of the Photographic Process, 4th Ed., Macmillan, New York, 1977, Fig. 1.16, p. 39.
L. H. Brixner, "Structural and Luminescent Properties of the $Ln_2Hf_2O_7$-Type Rare Earth Hafnates", Mat. Res. Bull. vol. 19, pp. 143–149, 1984.

*Primary Examiner*—Jack Cooper
*Attorney, Agent, or Firm*—Carl O. Thomas

[57] ABSTRACT

A phosphor composition is disclosed containing a titanium free hafnium zirconium germanate phosphor which emits electromagnetic radiation principally in the spectral region to which silver halide exhibits native sensitivity. To maximize the intensity of emission the ratio of host metals satisfies the relationship:

$$D_{1+x}Ge_{1-x}$$

where
D is the combined sum of zirconium and hafnium and x is 0.15 to −0.50.

An X-ray intensifying screen is disclosed containing the phosphor composition.

12 Claims, 2 Drawing Sheets

PHOSPHOR COMPOSITION AND X-RAY INTENSIFYING SCREEN EXHIBITING PEAK EMISSION IN THE ULTRAVIOLET

FIELD OF THE INVENTION

The invention relates to novel X-ray intensifying screens. More specifically, the invention relates to fluorescent screens of the type used to absorb an image pattern of X-radiation and to emit a corresponding pattern of longer wavelength electromagnetic radiation for imagewise exposure of a silver halide radiographic element. The invention is also directed to a novel phosphor composition.

BACKGROUND OF THE INVENTION

A developable latent image is formed in a silver halide emulsion layer of a radiographic element when it is imagewise exposed to X-radiation. However, much of the highly energetic X-radiation simply passes through the radiographic element without being absorbed. To reduce patient exposure to X-radiation it is conventional practice in medical radiology to employ silver halide radiographic elements in combination with intensifying screens, where the intensifying screen contains a phosphor layer that absorbs X-radiation more efficiently than silver halide and emits longer wavelength electromagnetic radiation which silver halide can more efficiently absorb.

Intensifying screens that emit in the ultraviolet or visible portion of the spectrum are generally known, as illustrated by Research Disclosure, Vol. 184, Aug. 1979, Item 18431, particularly Sections IX and XI. Research Disclosure is published by Kenneth Mason Publications, Ltd., Emsworth, Hampshire P010 7DD, England.

Green emitting intensifying screens have found widespread use with silver halide radiographic elements. To absorb light in the green portion of the spectrum silver halide emulsions must be spectrally sensitized by adsorbing one or more spectral sensitizing dyes to the surfaces of the silver halide grains in the emulsions. Although routine, spectral sensitization is not without its disadvantages. The dyes themselves are complex organic molecules that, on a weight basis, are more expensive than silver, but, unlike silver, are not recoverable for reuse. Further, emulsion addenda that also adsorb to grain surfaces, such as antifoggants and stabilizers, can displace the dyes, leading to reduced spectral sensitivity.

Blue emitting intensifying screens capable of imagewise exposing silver halide radiographic elements within the blue (400 to 500 nm) region of the spectrum are known in the art. Although many blue emitting phosphors are known, calcium tungstate has for many years been the standard blue emitting phosphor for use in intensifying screens against which blue emitting intensifying screens have been compared.

In the blue region of the spectrum silver halides exhibit sharply declining light absorption as a function of increasing wavelengths. James The Theory of the Photographic Process, 4th Ed., Macmillan, New York, 1977, FIG. 1.16, p. 39, shows the relative absorptions of representative photographically useful silver halides as a function of wavelength. From FIG. 1.16 it is apparent that adsorption properties of silver halides in the blue portion of the spectrum are in transition from very high levels of absorption that occur in the near ultraviolet (220 to 400 nm) portion of the spectrum to the very low levels of absorption that occur in the green region of the spectrum. Thus, spectral sensitizing dyes are often used with silver halide emulsions intended to be exposed with blue emitting phosphors (note Research Disclosure, Item 18431, cited above, Section X), and this results in the same disadvantages encountered in using green emitting intensifying screens.

In addition to or instead of using a blue absorbing spectral sensitizing dye, it is also common to incorporate iodide into the silver halide emulsions to enhance their sensitivity within the blue portion of the spectrum. Although iodide in low levels is commonly employed in photography, there are distinct disadvantages. When iodide is incorporated in silver halide emulsions, the rate of processing is slowed and the frequency with which processing solutions must be replenished is increased. The former disadvantage is particularly troublesome in radiographic imaging, since total processing must be accomplished in less than 90 seconds and, preferably, less than one minute. The latter disadvantage has become of increasing concern as environment protecting regulations on spent processing solutions have become progressively more demanding.

In most medical applications for X-ray imaging a pair of intensifying screens are employed in combination with a radiographic film having silver halide emulsion layer units coated on opposite sides of the support. This arrangement makes maximum use of the X-radiation available for imaging. Unfortunately, unless additional structural features are added, this arrangement also has the disadvantage of reduced image sharpness attributable to crossover. Crossover results when light emitted by one intensifying screen penetrates the adjacent silver halide layer unit and crosses through the support to also expose the silver halide emulsion unit on the opposite side of the support. Eliminating crossover involves incorporating additional light intercepting layers in the radiographic element, thereby complicating its construction and/or processing.

Although it has been recognized that silver halide possesses more native sensitivity to ultraviolet radiation than to visible light and although it has been recognized that, in principle, X-ray intensifying screens can be constructed to emit ultraviolet light, the fact is that the main thrust of X-ray intensifying screen and film imaging system development has been toward those imaging systems that employ visible light for screen emission and film exposure. One reason for this approach is that the development of silver halide radiographic films has been greatly influenced by the parallel development of silver halide photographic elements, which are necessarily responsive to visible light. Another reason lies in the fact that the organic materials (e.g., binders, hydrophilic colloid vehicles, film supports, etc.) exhibit high levels of absorption of shorter wavelengths of ultraviolet radiation.

Kroger et al U.S. Pat. No. 2,542,336 discloses phosphors containing titanium as an activator and having a matrix comprised of one or more of the oxides of zirconium, hafnium, thorium, germanium or tin to which may be added either acid oxides or basic oxides or both. Disclosed basic oxides are the oxides of sodium, potassium, rubidium, cesium, lithium, barium, calcium, strontium, magnesium, beryllium and zinc. Disclosed acid oxides are $SO_3$, $B_2O_3$, $P_2O_5$ and $SiO_2$. Titanium activated zirconium oxide, magnesium stannate, calcium zirconate and zirconium phosphate are each specifically disclosed.

Titanium activated germanium oxide is a blue emitting phosphor, but investigations have revealed titanium activated germanium oxide to exhibit low emission intensities.

Titanium activated hafnium oxide exhibits peak emission in the longer wavelength (approx. 475 nm) blue portion of the spectrum, with a substantial portion of its total emission extending into the green region of the spectrum. L. H. Brixner, "Structural and Luminescent Properties of the $Ln_2Hf_2O_7$-type Rare Earth Hafnates", Mat. Res. Bull., Vol. 19, pp. 143–149, 1984, after reporting the properties of $Ti^{+4}$ as an activator for rare earth hafnates, noted a high level of performance for titanium activated optical grade hafnia ($HfO_2$), but considered the phosphor impractical for intensifying screen use based on the price of optical grade hafnia. Optical grade hafnia contains less than $3 \times 10^{-4}$ mole of zirconia ($ZrO_2$) per mole of hafnia.

Bryan et al U.S. Pat. No. 4,988,880 discloses that efficient X-ray intensifying screens can be constructed from titanium activated hafnia phosphors containing minor amounts of zirconium, but higher amounts than found in optical grade hafnia, specifically:

$$Hf_{1-z}Zr_z$$

where z ranges from $4 \times 10^{-4}$ to 0.3. Sharp losses in emission intensities were found at higher values of z. The same phosphor, but lacking a titanium activator, is also disclosed.

Phosphors which contain germanium, zirconium or hafnium and oxygen with oxygen being complexed with other nonmetals, such as sulfur, boron, phosphorus, silicon and the like, produce distinctly different crystal structures than those of hafnium and/or zirconium germanate and are not considered relevant to this invention.

RELATED PATENT APPLICATION

Lambert et al U.S. Ser. No. 706,510, filed May 28, 1991, commonly assigned and now U.S. Pat. No. 5,112,700, a continuation-in-part of U.S. Ser. No. 556,588, filed Jul. 20, 1990, now abandoned, discloses and claims titanium doped blue emitting hafnium zirconium germanate and X-ray intensifying screens containing these phosphors.

SUMMARY OF THE INVENTION

It is an object of this invention to provide an X-radiation intensifying screen and a phosphor for use therein having a peak emission intensity within for the ultraviolet region of the electromagnetic radiation spectrum to which silver halide exhibits a high level of native sensitivity and within the ultraviolet region of the electromagnetic radiation spectrum to which organic binders and vehicles found in intensifying screens and silver halide radiographic elements are relatively transparent.

It is another object of this invention to provide an X-radiation intensifying screen and phosphor for use therein that emits electromagnetic radiation of a wavelength that can be adsorbed by silver halide emulsion layer units of radiographic elements to a degree that improves image sharpness.

In one aspect, the invention is directed to an intensifying screen comprised of a support and a fluorescent layer containing a phosphor capable of absorbing X-radiation and emitting electromagnetic radiation principally in the spectral region to which silver halide exhibits native sensitivity. The intensifying screen is characterized in that the phosphor is titanium-free hafnium zirconium germanate in which hafnium, zirconium and germanium satisfy the relationship:

$$D_{1+x}Ge_{1-x}$$

where

D is the combined sum of zirconium and hafnium and x is 0.15 to $-0.50$.

In another aspect, this invention is directed to phosphor composition comprised of titanium-free hafnium zirconium germanate in which hafnium, zirconium and germanium satisfy the relationship:

$$D_{1+x}Ge_{1-x}$$

where

D is the combined sum of zirconium and hafnium and x is 0.15 to $-0.50$.

DESCRIPTION OF PREFERRED EMBODIMENTS

All references to elements in terms of Group and Period designations are based on the designations assigned by the Periodic Table of Elements as adopted by the American Chemical Society.

Figure 1:
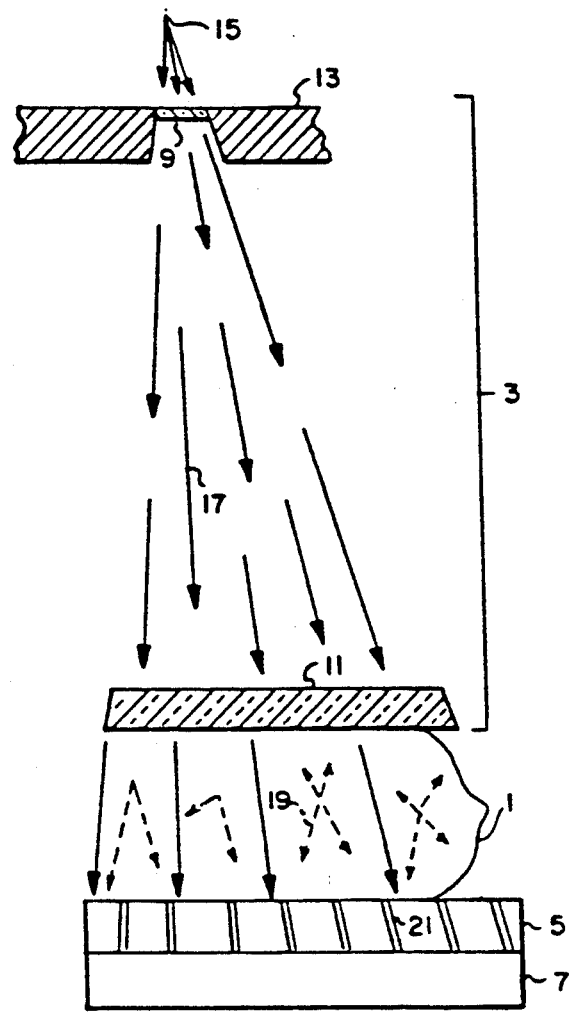
FIG. 1 is a schematic diagram of an imaging arrangement.

A typical arrangement for examining human tissue with X-radiation is illustrated in FIG. 1. Tissue 1 to be examined radiographically, in this instance a mamma (breast), is located between an exposure and compression arrangement 3 and an exposure grid 5. Beneath the grid is located an exposure recording assembly 7.

The exposure and compression arrangement is comprised of a radiation input window 9 (the output window of an X-radiation generating tube) and an output window 11 (the input window for supplying X-radiation to the subject), which are each substantially transparent to X-radiation. The output window acts as a compression element so that the mamma is held well compressed during examination. A wall 13 formed of a material having low penetrability to X-radiation joins the input window and defines with it an X-radiation field emanating from a tube or other conventional source, shown schematically as emanating from focal spot 15.

Unscattered X-radiation passing through the input and output windows and tissue to the grid is indicated by the solid arrows 17. Collisions of X-radiation with matter within the tissue results in part in absorption of the X-radiation and in part in redirecting the X-radiation. Redirected—i.e., scattered X-radiation—is illustrated schematically by dashed arrows 19.

The grid is equipped with vanes 21, which are relatively impenetrable by the X-radiation and arranged parallel to the unscattered X-radiation. The vanes permit almost all of the unscattered X-radiation to pass through the grid uninterrupted. X-radiation that has been slightly redirected is capable of passing through the grid also, but the most highly scattered X-radiation, which if left alone, would produce the greatest degradation in image sharpness, is intercepted and deflected by the vanes. The thickness and spacing of the vanes is exaggerated in FIG. 1 for ease of illustration. By vane construction and spacing the desired balance between the attenuation of X-radiation supplied to the exposure recording assembly and the sharpness of the image can be realized. To minimize X-ray attenuation the grid can be entirely eliminated, but a grid is usually preferred to improve sharpness. Suitable exposure grids are known and commercially available.

Figure 2:
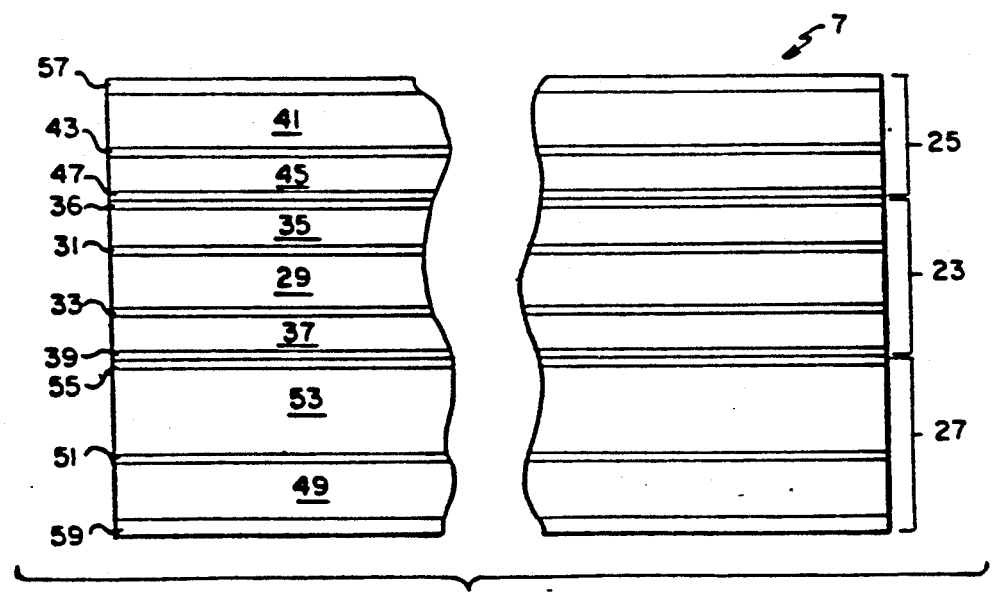
FIG. 2 is a schematic diagram of a dual coated radiographic element and a pair of intensifying screens forming an assembly.

In FIG. 2 the exposure recording assembly is shown in greater detail. A conventional case or cassette used to compress the elements of the assembly into close contact is not shown. The assembly consists of three separate elements, a dual coated silver halide radiographic element 23, a front intensifying screen 25 intended to be positioned between the radiographic element and an exposing X-radiation source, and a back intensifying screen 27.

As shown, the dual coated radiographic element consists of a support 29 including subbing layers 31 and 33 coated on its opposite major faces. Silver halide emulsion layers 35 and 37 overlie the subbing layers 31 and 33, respectively. Overcoat layers 36 and 39 overlie the emulsion layers 35 and 37, respectively.

As shown, the front intensifying screen is comprised of a support consisting of a substrate portion 41 and an interposed layer portion 43, a fluorescent layer 45, and an overcoat layer 47. Similarly, the back intensifying screen as shown is comprised of a support consisting of a substrate portion 49 and an interposed layer portion 51, a fluorescent layer 53, and an overcoat layer 55. Anticurl layers 57 and 59 are on the major faces of the front and back screen substrate portions 41 and 49, respectively, opposite the fluorescent layers.

In use, X-radiation enters the image recording assembly through the front screen anticurl layer 57 and substrate portion 41 passing uninterrupted to fluorescent layer 45. A portion of the X-radiation is absorbed in the front screen fluorescent layer. The remaining X-radiation passes through the overcoat layers 47 and 36. A small portion of the X-radiation is adsorbed in the silver halide emulsion layer 35, thereby contributing directly to the formation of a latent image in the emulsion layer. However, the major portion of the X-radiation received by the emulsion layer 35 passes through the support 29 and associated subbing layers 31 and 33 to the remaining silver halide emulsion layer 37. Again, a small portion of the X-radiation is absorbed in the remaining silver halide emulsion, thereby contributing directly to the formation of a latent image in this emulsion layer, and, again, the major portion of the X-radiation received by the emulsion layer 37 passes through the overcoat layers 39 and 55 to the fluorescent layer 53 of the back screen. The major portion of the X-radiation striking the back screen fluorescent layer is absorbed in this layer.

Exposing X-radiation is principally absorbed in the fluorescent layers 45 and 53 and reemitted by the fluorescent layers as ultraviolet (hereinafter also referred to as UV) electromagnetic radiation more readily absorbed by the silver halide radiographic element 23. Ultraviolet radiation emitted by the front intensifying screen fluorescent layer 45 exposes the adjacent silver halide emulsion layer 35. UV radiation emitted by the back intensifying screen fluorescent layer 53 exposes the adjacent silver halide emulsion layer 37. These UV exposures primarily account for the latent image formed in the silver halide emulsion layers.

From the foregoing, it is apparent that all of the layers above the fluorescent layer 53 must be penetrable by X-radiation to at least some extent. While the silver halide emulsion layers usefully absorb some X-radiation, the only other usefully absorbed X-radiation occurs in the front intensifying screen fluorescent layer. Thus, the supports and overcoat and subbing layers overlying the back intensifying screen are chosen to be as nearly transparent to exposing X-radiation as possible.

It is also apparent that the overcoat layers 36 and 47 separating the front intensifying screen fluorescent layer and the emulsion layer adjacent thereto as well as the overcoat layers 39 and 55 separating the back intensifying screen fluorescent layer and the emulsion layer adjacent thereto are preferably transparent to the emitted UV radiation. Being transparent to both X-radiation and UV radiation, the overcoat layers 36, 47, 39, and 55, though preferred for other reasons, are not needed for imaging and can be omitted.

Although a dual coated radiographic element employed with a pair of intensifying screens is shown in FIG. 2, it is apparent that a single intensifying screen and a radiographic element containing a single silver halide emulsion layer can be used for imaging. For example, the front intensifying screen 25 and the layers of the radiographic element lying above the support 29 can be omitted. This simplified arrangement is currently the most widely employed arrangement for mammographic examination. However, the majority of thoractic and abdominal examinations employ the full assembly 7 as shown in FIG. 2.

In the present invention an intensifying screen is provided capable of absorbing X-radiation and emitting electromagnetic radiation of a peak intensity in the ultraviolet region, within which silver halide exhibits native sensitivity. Further, peak emission intensity is placed within the ultraviolet region so that it occurs at longer ultraviolet wavelengths to which common organic binders, polymers and vehicles used in constructing films and screens are substantially transparent. That is, the intensifying screens of this invention are capable of absorbing an imagewise pattern of X-radiation and emitting a corresponding image pattern at peak wavelengths in the near ultraviolet region of from 320 to 380 nm, preferably 330 to 360 nm. Within these wavelength ranges the native senstivities of silver halide are much higher than within the visible spectrum, yet the absorption by the conventional organic components of the intensifying screen and radiographic film are relatively low, usually to the point of being entirely negligible. The adsorption of the silver halide in the peak emission wavelength range of from 320 to 380 is sufficiently high that at the silver coating coverages conventionally employed in constructing radiographic elements the ultraviolet light supplied to each silver halide emulsion layer unit is almost entirely absorbed. Hence, crossover exposure in dual coated elements is limited, usually negligible, allowing sharp images to be obtained without introducing any other structural features into the film for the express purpose of absorbing ultraviolet radiation.

The present invention has been made possible by providing the intensifying screen with a fluorescent layer that is capable of efficiently absorbing X-radiation and emitting with peak intensity in the 320 to 380 (preferably 330 to 360) nm region of the spectrum. Specifically, this invention is directed to the discovery that a titanium-free hafnium zirconium germanate phosphor is capable of peak emission in the 320-380 (preferably 330 to 360) nm region of the electromagnetic spectrum while also, with proper selection of the ratios of the Group 4 host metal to germanium, exhibiting high emission efficiencies. The emission outputs are, in fact, larger than those realized using titanium-free germania (GeO$_2$) as a phosphor and larger in the region of native silver halide sensitivities than those realized using titanium-free hafnium zirconium germanate as a phosphor with the ratio of the Group 4 (hafnium and zirconium) host metals present to germanium exceeding 1.35. Stated another way, it has been recognized quite unexpectedly that titanium-free hafnium zirconium germanate phosphors with a range of Group 4 host metal to germanium proportions limited to a specific range give the desired 320 to 380 nm peak emission spectrum sought and at the same time yield superior emission intensities.

It has been discovered quite unexpectedly that titanium-free hafnium zirconium germanate phosphors capable of emitting principally in the 320 to 380 nm region of the spectrum and capable of yielding increased emissions in this spectral region are those that satisfy the metal relationship: (I)

$$D_{1+x}Ge_{1-x}$$

where

D is the combined sum of zirconium and hafnium (i.e., the Group 4 host metal) and x is in the range of from 0.15 to $-0.50$. In a specifically preferred form of the invention x is up to 0.20, optimally up to 0.15; and x is preferably less negative than $-0.50$.

The phosphors of the invention are titanium-free. That is, no titanium is intentionally added to the phosphor and any titanium that is present in the phosphor is there as a low level impurity. To the extent that titanium impurities are present in the phosphor they are in all instances present in a concentration of less than $5 \times 10^{-4}$ atom per atom of Group 4 metal.

The ratio of the Group 4 host metals, hafnium and zirconium, can be widely varied. Although better X-radiation absorption results from increasing the proportion of hafnium in the phosphor, the substitution of zirconium for hafnium has a surprisingly small effect on phosphor emission as compared, for example, to substituting zirconium for hafnium in monoclinic titanium activated hafnia lacking germanium.

While the purest obtainable forms of hafnium can be employed in the practice of this invention without intentionally incorporating zirconium, except as an impurity, it is not necessary to incur the significant expense of using high purity hafnium to realize the advantages of this invention. For example, optical grade hafnia, which exhibits a zirconium concentration of less than $3 \times 10^{-4}$ mole Zr/mole Hf, is not required for use in the practice of this invention.

Where high, but less than maximum emission levels are acceptable, it is possible to employ zirconium as the Group 4 host metal without intentionally including hafnium, except as a zirconium impurity. Thus, all attainable proportions of hafnium to zirconium are within the contemplation of this invention.

In the preferred forms of the invention the ratios of Group 4 host metals satisfy the relationship: (III)

$$Hf_{1-z}Zr_z$$

where z is $4 \times 10^{-4}$ to $<0.5$. In the above relationship z is most preferably at least $1 \times 10^{-3}$ and optimally at least $2 \times 10^{-3}$; and z most preferably ranges up to 0.4 and optimally up to 0.3.

When the preferred ratios of hafnium, zirconium and germanium are all satisfied, the phosphor metals are described by the following relationship: (IV)

$$(Hf_{1-z}Zr_z)_{1+x}Ge_{1-x}$$

where x is 0.15 to $-0.50$ and z is $4 \times 10^{-4}$ to $<0.5$. Further, x is most preferably up to 0.1, optimally up to 0.05, and most preferably less negative than $-0.20$; z is most preferably at least $1 \times 10^{-3}$, optimally at least $2 \times 10^{-3}$, and most preferably up to 0.40, optimally up to 0.30.

In the preferred form of the invention the phosphor consists essentially of germanium, hafnium, zirconium and oxygen. Since hafnium, zirconium and germanium are each present in the phosphor in a +4 oxidation state, it follows that there are 2 oxygen atoms for each atom of these metals present. Thus, in specifically preferred forms of the invention, paralleling the metal ratios of relationships II and IV, the compositions of the phosphor satisfy the relationships: (V)

$$D_{1+x}Ge_{1-x}O_4$$

(VI)

$$(Hf_{1-z}Zr_z)_{1+x}Ge_{1-x}O_4$$

where

D, x and z can take any of the values identified above.

The titanium-free hafnium zirconium germanate phosphors of this invention described above, once formed to satisfy the composition requirements of this invention, can be employed to form an intensifying screen of any otherwise conventional type. In its preferred construction the intensifying screen is comprised of a support onto which is coated a fluorescent layer containing the titanium-free hafnium zirconium germanate phosphor in particulate form and a binder for the phosphor particles. Titanium-free hafnium zirconium germanate phosphors can be used in the fluorescent layer in any conventional particle size range and distribution. It is generally appreciated that sharper images are realized with smaller mean particle sizes. Preferred mean particle sizes for the titanium-free hafnium zirconium germanate phosphors of this invention are in the range of from 0.5 μm to 40 μm, optimally from 1 μm to 20 μm.

It is, of course, recognized that the titanium-free hafnium zirconium germanate phosphor particles can be blended with other, conventional phosphor particles, if desired, to form an intensifying screen having optimum properties for a specific application. Intensifying screen constructions containing more than one phosphor containing layer are also possible, with the titanium-free hafnium zirconium germanate phosphor particles being present in one or more of the phosphor containing layers.

The fluorescent layer contains sufficient binder to give structural coherence to the titanium-free hafnium zirconium germanate layer. The binders employed in the fluorescent layers can be identical to those conventionally employed in fluorescent screens. Such binders are generally chosen from organic polymers which are transparent to X-radiation and emitted radiation, such as sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly-(alkylene oxides); aqueous ethanol soluble nylons; poly-(alkyl acrylates and methacrylates) and copolymers of alkyl acrylates and methacrylates with acrylic and methacrylic acid; poly(vinyl butyral); and poly(urethane) elastomers. These and other useful binders are disclosed in U.S. Pat. Nos. 2,502,529; 2,887,379; 3,617,285; 3,300,310; 3,300,311; and 3,743,833; and in Research Disclosure, Vol. 154, February 1977, Item 15444, and Vol. 182, June 1979. Particularly preferred intensifying screen binders are poly(urethanes), such as those commercially available under the trademark Estane from Goodrich Chemical Co., the trademark Permuthane from the Permuthane Division of ICI, Ltd., and the trademark Cargill from Cargill, Inc.

The support onto which the fluorescent layer is coated can be of any conventional type. Most commonly, the support is a film support. For highest levels of image sharpness the support is typically chosen to be black or transparent and mounted in a cassette for exposure with a black backing. For the highest attainable speeds a white support, such as a titania or barium sulfate loaded or coated support is employed. Specifically preferred reflective supports offering the highest attainable balance of speed and sharpness are those containing reflective microlenslets, disclosed by Roberts et al U.S. Pat. No. 4,912,333.

Any one or combination of conventional intensifying screen features, such as overcoats, subbing layers, and the like, compatible with the features described above can, of course, be employed. Both conventional radiographic element and intensifying screen constructions are disclosed in Research Disclosure, Item 18431, cited above, the disclosure of which and the patents cited therein are here incorporated by reference. Research Disclosure is published by Kenneth Mason Publications, Ltd., Emsworth, Hampshire P010 7DD, England.

In one specifically preferred form of the invention, illustrating intensifying screens satisfying the requirements of the invention intended to be employed with a separate silver halide emulsion layer containing radiographic element, the phosphor described above can be substituted for any of the conventional phosphors employed in either the front or back intensifying screens of Luckey, Roth et al U.S. Pat. No. 4,710,637, the disclosure of which is here incorporated by reference. Similar modification of any of the conventional intensifying screens disclosed in the following patents is also contemplated: DeBoer et al U.S. Pat. No. 4,637,898; Luckey, Cleare et al U.S. Pat. No. 4,259,588; Luckey U.S. Pat. No. 4,032,471; and Roberts et al, cited above.

Although the utility of the phosphors has been described by specific reference to X-ray intensifying screens, it is appreciated that the phosphors can be applied to different end uses, if desired.

EXAMPLES

The invention can be better appreciated by reference to the following specific examples. Examples with a number bearing the suffix E represent preferred embodiments of the invention while Examples with a number bearing the suffix C are included for the purpose of comparing variations.

Description of Measurement Procedures Employed

The relative luminescence response of the phosphor powder was measured by packing the phosphor powder into aluminum planchets (2 mm high × 24 mm diameter) at a coverage of about 1 g/cm$^2$ and exposing the sample to filtered X-radiation. The X-ray source was a tungsten target tube in a XRD 6 TM generator operating at 28 kVp and 30 mA. The filtration consisted of 1.31 mm of aluminum and 0.05 mm of molybdenum. The luminescence response was measured using an IP-28 TM photomultiplier tube at 500 V bias. The voltage from the photomultiplier was measured with a Keithley TM high impedance electrometer and is proportional to the total light output of the sample.

Emission spectra were obtained with an instrument consisting of an Instruments S.A. Model HR 320 TM grating spectrometer coupled with a Princeton Applied Research Model 1421 TM intensified linear diode array detector. The data acquisition and processing was controlled by a Princeton Applied Research Model 1460 OMA III TM optical multichannel analyzer. Spectra were corrected for the spectral response of the detector-spectrograph combination. Samples were placed in planchets as described above and irradiated with unfiltered X-rays from a tungsten-target tube in an XRD 6 TM generator operating at 28 kVp and 30 mA.

EXAMPLES 1-5

$(Hf_{0.9975}Zr_{0.0025})GeO_4$

Examples 1-5 demonstrate the spectral emission characteristics and the luminescence response of undoped (titanium-free) HfGeO$_4$. The effect of different fluxes is also described in these examples.

A hydrous hafnium zirconium germanium precursor was prepared as follows: 78.3 grams of RGS HfOCl$_2$.8-H$_2$O (Teledyne Wah Chang Albany; 0.25 mol % Zr) were dissolved in 500 mL of distilled water. 20 grams of GeO$_2$ (KBI, 99.999%) were placed in 165 mL of distilled water and dissolved with the addition of 6 mL of NH$_4$OH (Eastman Kodak Company, ACS reagent). The two solutions were simultaneously added as fine streams to 335 mL of rapidly stirred distilled water in an erlenmeyer flask. This solution was then added dropwise to a stirred solution of 23.75 mL of NH$_4$OH in 1000 mL of distilled water. A gelatinous precipitate immediately formed. After complete addition, the gel was collected on a Buchner funnel by vacuum filtration. The collected material was dried at 100° C. overnight in a convection oven. 64.4 grams of the dried gel were washed in 161 mL of distilled water for 1 hour, collected on a Buchner funnel by vacuum filtration, and dried overnight at 100° C: in a convection oven.

5 gram portions of the precursor were ground in an agate mortar with one of the following fluxes: 24 wt % Li$_2$SO$_4$ (Alfa, 99.7%), 7 wt % LiBO$_2$ (Johnson Matthey, 99.9%), 11 wt % Li$_2$MoO$_4$ (Aesar 99%), and 6.5 wt % Na$_2$MoO$_4$ (Aesar, reagent). An additional 5 gram sample was ground without flux. The ground materials were placed in 10 mL alumina crucibles and covered with alumina lids. All the samples were fired, except the LiBO$_2$ flux sample, for 6 hours at 1100° C. in a box furnace. The LiBO$_2$ flux sample was fired for 6 hours at 950° C. in a box furnace. After cooling, each sample was washed in 150 mL of distilled water, collected and dried at 95° C.

The relative luminescence (Rel. I) responses of each sample, as well as the spectral characteristics, are shown in Table I. The emission peak position is defined as the wavelength of maximum intensity, and the peak width is defined as the width at half the maximum peak intensity.

TABLE I

| Ex. | Flux | Rel. I | Peak (nm) | Peak Width (nm) |
|---|---|---|---|---|
| 1E | Li$_2$SO$_4$ | 100 | 348 | 110 |
| 2E | LiBO$_2$ | 116 | 361 | 125 |
| 3E | Na$_2$MoO$_4$ | 69 | 361 | 95 |
| 4E | Li$_2$MoO$_4$ | 51 | 368 | 98 |
| 5E | none | 51 | 353 | 105 |

Figure 3:
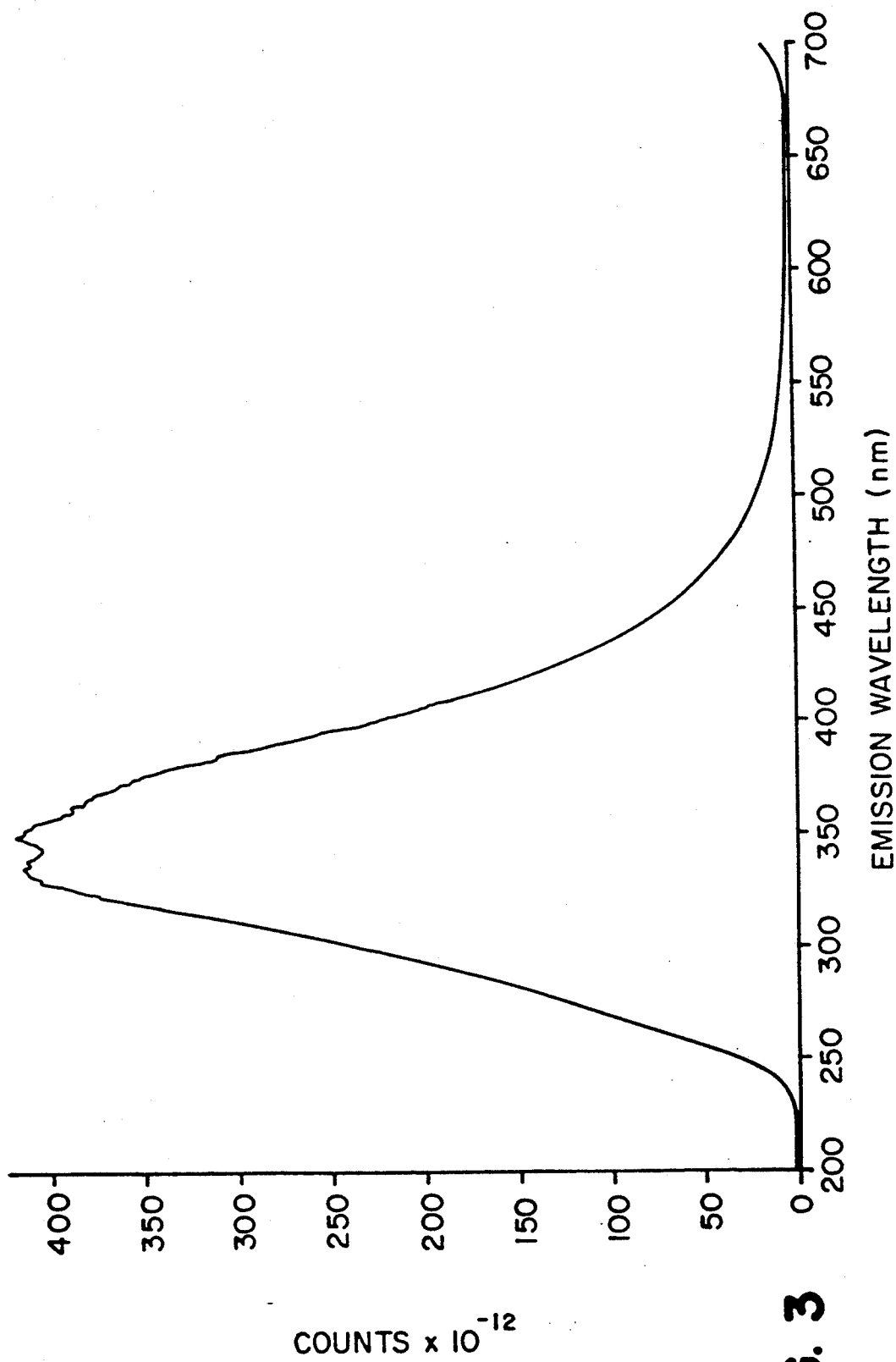
FIG. 3 is a plot of relative emission intensity versus emission wavelength.

All of the samples show a strong long wavelength ultraviolet emission, with peak emission in the 320 to 380 nm range. The lithium metaborate and lithium sulfate samples show the strongest luminescence response. The sample prepared with the lithium sulfate is preferred because of the shift of the emission to shorter wavelengths relative to that observed for the sample prepared with lithium metaborate. The emission profile of the sample prepared in the presence of the lithium sulfate flux is shown in FIG. 3.

EXAMPLES 6-10

(Hf$_{0.9975}$Zr$_{0.0025}$)$_{(1+x)}$Ge$_{(1-x)}$O$_4$ (x = −0.1 to 0.30)

Examples 6-10 inclusive demonstrate the luminescence response of hafnium zirconium germanate phosphors in which the hafnium (zirconium) to germanium ratio is varied.

Examples 8-10 were prepared using 2.500 grams of GeO$_2$ (chemical grade, 99.999%). 0.125 and 0.375 grams of GeO$_2$ were used in examples 6 and 7. The GeO$_2$ was dissolved in 500 mL of 95°-100° C. distilled water. The appropriate molar amount of RGS HfOCl$_2$·8H$_2$O (Teledyne Wah Chang Albany, Zr=0.25 mol %) for each value of x was dissolved in 100 mL of distilled water. After the hafnyl chloride solution was filtered, it was added to the hot GeO$_2$ solution.

The number of moles of base required was determined as twice the combined number of moles of Hf and Ge for each value of x. Each base solution was prepared by adding the calculated molar amount of concentrated NH$_4$OH (Baker, reagent) to 40 mL of distilled water. The base was added dropwise to the hot hafnyl chloride/GeO$_2$ solution with vigorous stirring. After addition, the gel solution was stirred and heated at 95°-100° C. for 45 minutes and then collected while hot on a Buchner funnel by vacuum filtration. The collected gel was dried overnight at 95° C. 4 grams of each sample were washed in 10 mL of distilled water for 30 minutes and then dried in a convection oven at 90° C. for 3 hours. The dried and washed samples were placed in 10 ml alumina crucibles, covered with alumina lids and fired at 1200° C. for 6 hours in a box furnace.

The relative luminescence responses of each sample, as well as spectral characteristics, are shown in Table II.

The emission peak position, as well as peak width, are defined as previously described.

TABLE II

| (Hf$_{0.9925}$Zr$_{0.0025}$)$_{(1+x)}$Ge$_{1-x}$O$_4$ (x = −0.10 to 0.30) | | | | |
|---|---|---|---|---|
| Example | x | Rel. I | Peak (nm) | Peak Width (nm) |
| 6E | −0.10 | 90 | 343 | 98 |
| 7E | 0.00 | 62 | 354 | 104 |
| 8E | 0.10 | 49 | 368 | 113 |
| 9C | 0.20 | 28 | 388 | 120 |
| 10C | 0.30 | 25 | 400 | 160 |

X-ray diffraction analysis showed the tetragonal scheelite structure to be maintained for $-0.1 \leq x \leq 0.3$. However, at values of x of 0.20 and 0.30 the peak intensity of emission had shifted slightly above the preferred maximum wavelength of 380 nm.

The invention has been described in detail with particular reference to preferred embodiments thereof, but it will be understood that variations and modifications can be effected within the spirit and scope of the invention.

What is claimed is:

1. An intensifying screen comprised of
   a support and
   a fluorescent layer containing a phosphor capable of absorbing X-radiation and emitting electromagnetic radiation at a peak intensity in the range of from 320 to 380 nm comprised of titanium-free crystals of a tetragonal scheelite structure,
   characterized in that the crystals consist essentially of oxygen and metals satisfying the relationship:

(Hf$_{1-z}$Zr$_z$)$_{1+x}$Ge$_{1-x}$ where
   x is 0.15 to −0.10 and
   z is in the range of from at least $4 \times 10^{-4}$ to less than 0.5.

2. An intensifying screen according to claim 1 further characterized in that x is up to 0.05.

3. An intensifying screen according to claim 1 further characterized in that z is up to 0.4.

4. An intensifying screen according to claim 3 further characterized in that z is up to 0.3.

5. An intensifying screen according to claim 1 further characterized in that z is at least $1 \times 10^{-3}$.

6. An intensifying screen according to claim 5 further characterized in that z is at least $2 \times 10^{-3}$.

7. A phosphor composition comprised of titanium-free crystals of a tetragonal scheelite crystal structure which consist essentially of oxygen and metals satisfying the relationship:

(Hf$_{1-z}$Zr$_z$)$_{1+x}$Ge$_{1-x}$ where
   x is 0.15 to −0.10 and
   z is at least $4 \times 10^{-4}$ to less than 0.5.

8. A phosphor composition according to claim 7 in which x is up to 0.05.

9. A phosphor composition according to claim 7 in which z is up to 0.4.

10. A phosphor composition according to claim 9 in which z is up to 0.3.

11. A phosphor composition according to claim 7 in which z is at least $1 \times 10^{-3}$.

12. A phosphor composition according to claim 11 in which z is at least $2 \times 10^{-3}$.

* * * * *